US007191064B1

(12) United States Patent  
Myers et al.

(10) Patent No.: US 7,191,064 B1  
(45) Date of Patent: Mar. 13, 2007

(54) SCALE FOR SEVERE WEATHER RISK

(75) Inventors: Joel N. Myers, State College, PA (US); Michael A. Steinberg, State College, PA (US)

(73) Assignee: Accuweather, Inc., State College, PA (US)

( * ) Notice: Subject to any disclaimer, the term of this patent is extended or adjusted under 35 U.S.C. 154(b) by 0 days.

(21) Appl. No.: 10/982,926

(22) Filed: Nov. 8, 2004

Related U.S. Application Data (60) Provisional application No. 60/517,867, filed on Nov. 7, 2003.

(51) Int. Cl.
*G01W 1/00* (2006.01)

(52) U.S. Cl. .......................................................... 702/3

(58) Field of Classification Search ............... 702/3, 702/4, 5; 342/26 R, 26 A, 26 D, 460; 340/601, 340/539.13, 539.17, 539.2, 628, 26 R, 26 A, 340/26 D, 460
See application file for complete search history.

(56) References Cited

U.S. PATENT DOCUMENTS

| | | | |
|---|---|---|---|
| 6,018,699 A | | 1/2000 | Baron, Sr. et al. |
| 6,084,510 A * | | 7/2000 | Lemelson et al. ..... 340/539.13 |
| 6,240,369 B1 * | | 5/2001 | Foust ............................. 702/3 |
| 6,297,766 B1 * | | 10/2001 | Koeller .................. 342/357.06 |
| 6,339,747 B1 * | | 1/2002 | Daly et al. ...................... 702/3 |
| 6,493,633 B2 * | | 12/2002 | Baron et al. ................... 702/3 |
| 6,496,780 B1 * | | 12/2002 | Harris et al. ................... 702/3 |
| 6,498,987 B1 * | | 12/2002 | Wilt et al. ...................... 702/3 |
| 6,542,825 B2 * | | 4/2003 | Jones et al. .................... 702/3 |
| 6,581,009 B1 * | | 6/2003 | Smith ............................. 702/3 |
| 6,603,405 B2 * | | 8/2003 | Smith ......................... 340/905 |
| 6,650,972 B1 * | | 11/2003 | Robinson et al. .............. 701/3 |
| 6,654,689 B1 * | | 11/2003 | Kelly et al. .................... 702/3 |
| 6,823,263 B1 * | | 11/2004 | Kelly et al. .................... 702/3 |
| 6,845,324 B2 * | | 1/2005 | Smith ............................. 702/3 |
| 2004/0010372 A1 * | | 1/2004 | Schwoegler ................... 702/3 |
| 2004/0073482 A1 * | | 4/2004 | Wiggins et al. ............... 705/14 |

* cited by examiner

Primary Examiner—Donald McElheny, Jr.
(74) Attorney, Agent, or Firm—Blank Rome LLP (57) ABSTRACT

A method for conveying both a risk and the degree of risk of a severe weather at a particular geographic location is disclosed. The method involves receiving a location of interest from a requestor, forecasting a risk of severe weather for a specific time period associated with the location, computing a degree of severity level of the risk of severe weather for the location, and generating a report containing the risk forecast and the computed severity level that can be delivered or provided to the requestor. The severity level of the risk of severe weather is provided in an easy to understand graphic or other format.

30 Claims, 4 Drawing Sheets

SCALE FOR SEVERE WEATHER RISK

CROSS-REFERENCE TO RELATED APPLICATIONS

This application claims the benefit of priority under 35 U.S.C. § 119(e) of provisional patent application Ser. No. 60/517,867, entitled "Scale for Severe Weather Risk," filed on Nov. 7, 2003, the disclosure which is incorporated herein in its entirety.

BACKGROUND OF THE INVENTION

1. Field of the Invention

The present invention is directed to communicating natural phenomenological forecast information. In particular, the present invention is directed to a method for computing and conveying, using an easily recognized scale, the likelihood and degree of severe weather at a geographically defined location.

2. Description of Related Art

The National Weather Service (NWS) has traditionally issued warnings, watches, alerts, and advisories that describe the nature of severe weather threats. Those communications are typically in the form of text bulletins that cover a geographically large area, such as a county or larger region, and they do not generally differentiate between different threat levels, even when in effect for long time periods, such as six hours or more. Even when depicted graphically, those communications do not convey the specific level of risk of the severe weather threat and they generally cover a relatively long time period.

Consider NWS warnings and watches, for example. In terms of spatial differentiation, the NWS issues tornado and severe thunderstorm warnings using maximum granularity defined by zones that typically cover an entire county (some counties are divided into two zones). The NWS issues tornado and severe thunderstorm watches covering zones, but NWS watches often cover much larger areas.

In terms of temporal differentiation, the NWS severe thunderstorm and tornado warnings are typically issued minutes in advance of severe weather affecting a zone, and they are generally in effect for an hour or less. Other NWS warnings and watches may be issued with more advance notice and may be in effect for substantially longer periods of time.

In terms of severity differentiation, while the intensity of tornadoes and hurricanes are denoted by traditional 5-point scales (e.g., the Fujita Tornado Scale and the Saffir-Simpson Hurricane Scale), the risk for any particular location is not denoted by a scale. Other scales utilize either a yes/no approach or a high/significant/low risk approach to designate risk.

In U.S. Pat. No. 6,654,689 to Kelly et al., a system and method for generating storm warnings that are tailored automatically for a particular individual or business user's geographic location of interest is disclosed. In particular, the patent discloses a system whereby a user can establish a user profile defining a particular geographic location of interest and a contact address to which the user's personalized storm warning is to be delivered. The user may also establish a storm profile defining attributes of a storm for which the user desires a storm warning to be provided and an amount of advanced warning time to be provided by the personalized storm warning. The system then computes information describing a storm's severe weather conditions as well as the location and forecasted track of the storm. The forecasted storm track is compared to the user's profile and, for profiles defining locations of interest within the forecasted storm track, and if the storm track characteristics meet the user's defined attributes and advanced warning characteristics, a personalized storm warning is automatically generated. The personalized storm warning preferably identifies the storm conditions approaching the user's geographic location of interest, and the estimated time of arrival at that location. FIG. 5 of the Kelly et al. patent discloses an exemplary textual personalized e-mail storm warning provided to the user. The invention disclosed in the Kelly et al. patent does not include a storm warning including the likelihood or risk of a severe weather threat at a location and the degree of severity of the threat on an easily comprehensible scale.

U.S. Pat. No. 6,018,699 to Baron, Sr., et al., discloses a system for providing real-time site specific weather information having a weather alert manager that receives meteorological data and combines the meteorological data with a geographical grid covering a predefined geographic area to produce a storm profile for the storms within the geographical area, such that the geographic grid partitions the geographic area into a plurality of cells. The Baron, Sr., et al. patent also does not disclose providing a severe weather threat scale that depicts the storm profiles computed by the weather alert manager in an easily comprehensible scale.

U.S. Pat. No. 6,339,747 to Daly et al. discloses a system and method for preparing and manipulating a weather display including accurately displaying the current position of a weather storm cell and predicting and displaying a future path of the cell. The patent discloses and illustrates the use of well known storm cell and hurricane path cone- or fan-shaped probability distributions that cover the area forecast to be impacted by the severe weather threat. However, from a visual perspective, those probability distributions do not provide an easily comprehensible scale of the degree of risk for the relevant time for the risk of the severe weather threat at a given geographic location forecast to be impacted by the severe weather. Moreover, they do not provide the intensity level of the threat.

SUMMARY OF THE INVENTION

Accordingly, there exists a need for a method of communicating the risk of severe weather threats using a higher spatial granularity (i.e., smaller area), shorter forecast time periods, longer lead times, and an easy to understand scale indicating the degree of risk at a particular location for a particular time period that is not provided by prior art systems and methods.

The present invention addresses that need by providing a method for conveying the risk and/or intensity of severe weather (i.e., the probability or likelihood of occurrence), utilizing a code that is keyed to the threat level. Unlike previous methods of conveying severe weather threat information to end users, the present invention utilizes a higher or finer geographical or spatial granularity, a shorter temporal granularity, and a severity threat level granularity.

That is, in the present invention, a severe weather risk scale can have a significantly higher spatial granularity, differentiating by zip code or even by neighborhood. The risk scale can be of highly limited duration, as short as a few minutes. It can also be issued with a long lead time, in some cases several days in advance. In one aspect of the invention, the threat scale code may use different colors or shades to convey the degree of risk on a grid, map, graph, table, or other suitable report type. In another aspect of the invention, the code may use a scale of numbers to convey the degree of risk. In another aspect of the invention, the code may provide varying degrees of risk (i.e., severe, high, moderate, and low) for different time periods, as detailed as minute-by-minute. In yet another aspect of the invention, the code may provide the degree of risk on a sub-county level or even for an area the size of a city block.

The severe weather risk scale can be applied to individual types of weather events, such as tornado, hurricane, snow, or fog. It may also be applied to a combination of weather events, such as tornado/severe thunderstorm or heavy rain/flooding. It may further be applied to all weather types combined.

Accordingly, it is a principal object of the present invention to provide a method of communicating, in an easily comprehensible format, a forecast of a detailed risk of severe weather and the detailed degree of risk for a specific finite geographic location.

It is another object of the present invention to provide a method of communicating a forecast of the risk of a severe weather and the degree of the risk for a specific geographic location for a forecast period as short as one minute and as long as 72 hours or more (including a forecast period for a season, such as a hurricane season).

It is still another object of the present invention to provide the report electronically via a communications network taking into account the advantages and limitations of the respective sending and receiving hardware.

It is another object of the present invention to provide the report over a broadcast network such that it is displayable over the simultaneous projection of a green screen in a broadcast center.

The present invention offers several advantages over prior methods of conveying severe weather risk information. First, the present invention conveys the threat level with a scale, which can be colors, shades, numbers, graphs, tables, charts and other visual means (including combinations of graphics and text, for example) to communicate varying degrees of risk based on location (the old method only uses a color or number scale for reporting current weather conditions, such as with hurricane strength, or to distinguish between the presence and absence of risk, such as with flood watches, but they do not report the degree of risk).

Second, the present invention provides details concerning the severity of risk of severe weather for time periods covering one minute up to 72 hours or more (including a whole season).

Third, the present invention stresses the local threat level (rather than, for example, the NWS's zone threat level generally based on counties), but it conveys the threat level in proper context to surrounding geographic locations which may be at a different threat level.

Those and other objects and features of the present invention are accomplished as embodied and fully described herein by a method for conveying a risk and degree of severe weather threat at a location of interest, including the steps of receiving geographic location information for the location of interest; identifying present and historical weather data associated with an area around the location of interest; computing weather data associated with the area around the location of interest; forecasting a risk of severe weather for a specific time period associated with the location of interest; computing a degree of severity level of the risk of severe weather for the location of interest; generating a report containing the risk forecast and the computed severity level; and communicating the report.

The method may further include the step of converting the geographic location information into a position relative to an x-y coordinate system, a geographical information system (GIS) coordinate location, a pixel location in a graphic, or a latitude/longitude location.

The step of communicating the report is accomplished by storing the report in an electronic file on a server connected to a communications network, such that the electronic file is adapted to being downloaded to a client computer or other receiving device connected to the communications network. Alternatively, the step of communicating the report to the requester involves storing the report in an electronic file on a server, establishing a link from a server to a client computer or other receiving device via a communications network, and delivering the report to the client device.

The aforementioned report may include a scale representing the degree of risk of severe weather that is depicted graphically, using indicia, by a position on an x-y scale, textually, or numerically.

Other objects, features and advantages of the present invention will become evident to one skilled in the art from the following detailed description of the invention in conjunction with the referenced drawings.

DETAILED DESCRIPTION OF THE PREFERRED EMBODIMENT

In the present invention, several preferred embodiments are described for illustrative purposes.

Figure 1:
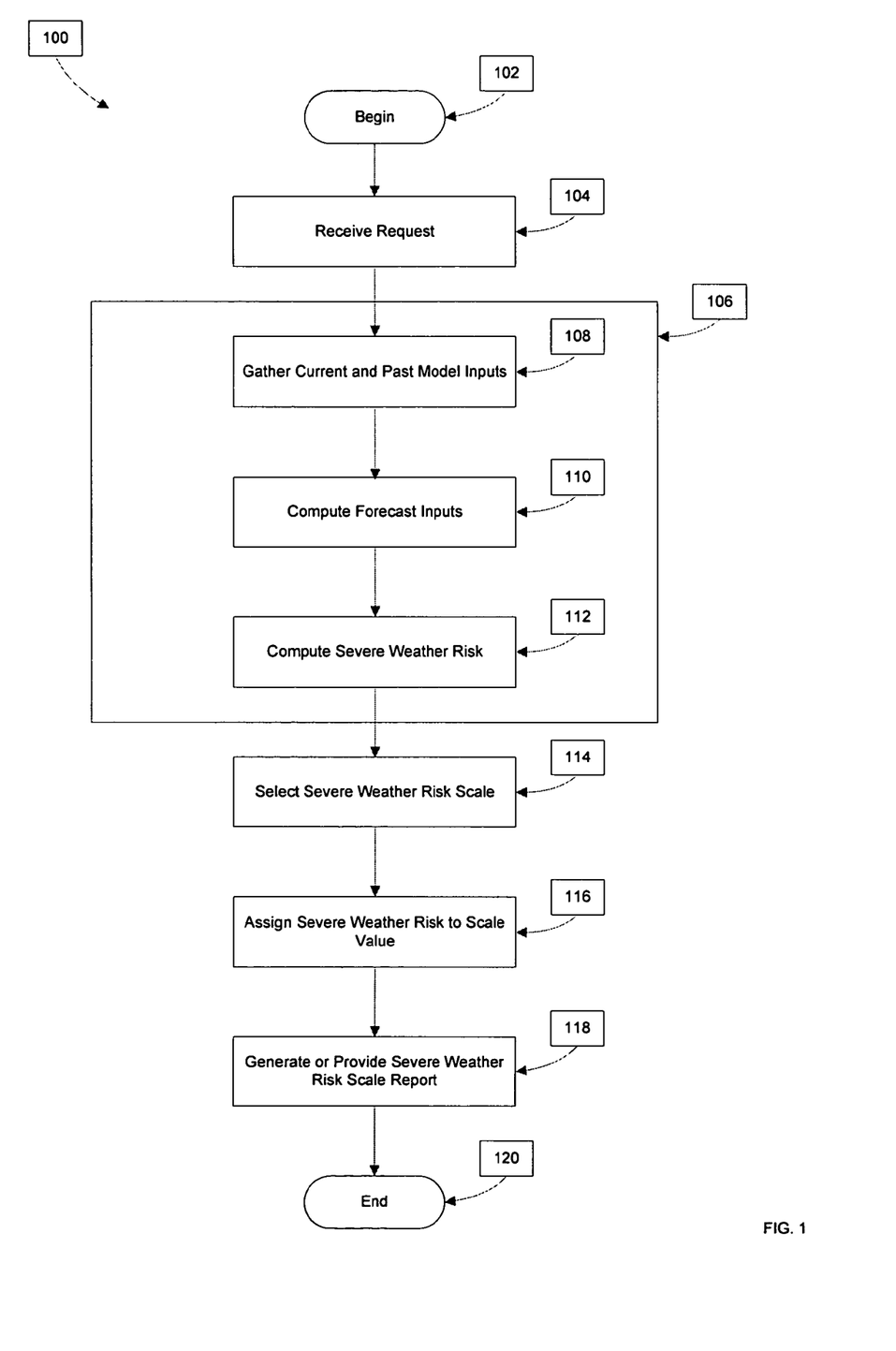
FIG. 1 is a high level process flow diagram showing a preferred method according to the present invention.

Turning first to FIG. 1, shown therein is a high level process flow diagram showing the present invention 100. The process begins with process step 104, which may be a request for a severe weather risk report. The request may be made electronically or by other means. In one embodiment of the method, a user operating a client computer (i.e., a desktop personal computer, handheld personal digital assistant, web-enabled mobile phone, text of picture-enabled mobile phone, etc.) (not shown), submits an electronic request to a severe weather risk server via a communications network (e.g., the Internet). The server then provides the responsive severe weather risk report to the client computer, a third party computer, or another device for review by the user or a third party. That may be accomplished using push technology, in which the severe weather risk report is electronically sent to the user's client computer or third party computer or other device. It may also be accomplished using pull technology, in which the severe weather risk report is electronically made available to the user for download by way of, for example, clicking on a link on a web page, or other method.

The request will include information about the type of report being requested as well as geographic information for which the severe weather risk report is to be based. Alternatively, the severe weather risk report server may query the user to submit a request having geographic information if such geographic information is not initially provided. Alternatively, a third party may specify the geographic information.

The geographic information should include a location of interest selected by the user or third party. The information may coincide with the location of the user submitting the request or the user's client computer, if they are different. The location of interest may be established by a zip code designation, a neighborhood, a ball field, a work place, or some other location. The severe weather risk server converts the geographic location information into a position on a grid. The grid will include at least one reference point.

To compute the forecast of severe weather risks and determine an appropriate risk level code for conveying the severe weather risk to a user, the present invention relies on various forecasting models and model inputs. The present invention may also rely on the expertise of meteorologists, climatologists, scientists, or other practitioners skilled in the art to supplement or modify the forecasting model inputs and outputs.

Accordingly, once a request has been received in process step 104, a severe weather risk forecasting module 106 will be executed on one or more interconnected computers (which may include the aforementioned severe weather risk server). The forecasting module 106 includes process steps 108, 110, and 112, which are described below.

In process step 108, the forecasting module 106 gathers current and past model input data. The types of data required depend on the model being used. For example, the forecast module 106 may utilize a variety of algorithms and methods including, but not limited to, those that calculate the forecast based upon how far the forecast period is from the current time and the length of the forecast period. Alternatively, a forecast can be calculated utilizing past and current Doppler radar or using the current strength and position of radar echoes to determine the most probable current strength and position of severe weather, and utilizing the trend and/or change in trend of strength and movement to determine the forecast for periods up to 4 to 6 hours into the future. Additional input data include, but are not limited to, atmospheric stability, time of day, satellite data, terrain, numerical model output and/or climatology information incorporated along with Doppler radar data to determine the forecast for periods up to 4 to 6 hours into the future. A forecast can be calculated utilizing numerical model output, atmospheric stability, time of day, satellite data, terrain and/or climatology to determine the forecast for periods from 4–6 hours to several days in the future.

In addition to the above numerical methods of forecasting severe weather threats, in process step 108, forecast meteorologists can also utilize their professional expertise to generate or modify the forecasts created by the various model algorithms.

In process step 110, the required forecast models are executed to obtain additional model inputs for use in subsequent steps.

In sum, the following model input data (Table 1, which is not an exhaustive list) may be used in the forecast module 106.

TABLE 1

| Model Input | Uses |
| --- | --- |
| Current surface observations | Typically used for short-term risk assessment |

TABLE 1-continued

| Model Input | Uses |
| --- | --- |
| Recent past surface observations | Typically used for short-term risk assessment |
| Recent and current Doppler radar data | Typically used for short or medium term risk assessment |
| Recent and current satellite data | Typically used for short or medium term risk assessment |
| Numerical model output (the output from computer forecast models) | Typically used for short, medium or long term risk assessment |
| Sounding data (a vertical profile of the atmosphere) | Typically used for short or medium term risk assessment |
| Climatological data | Typically used for medium or long term assessment |
| Geographic data | Typically used for short, medium or long term risk assessment |

Particular input data that might be utilized in process steps 108 and 110 include, but are not limited to, current, forecast, and past information.

Current and forecast input data may include:
dew points (measured at the surface, the boundary layer, and at 850 millibar, 700 mb, and 500 mb elevations);
air temperature (measured at the surface, at the boundary layer, and at 850 mb, 700 mb, and 500 mb elevations);
jet stream sector location (measured or estimated at 300 mb, 500 mb and 850 mb elevations);
jet stream wind velocity (measured or estimated at 300 mb, 500 mb and 850 mb elevations);
500 mb vorticity advection;
850 mb temperature advection;
surface wind speed;
precipitation (i.e., type, intensity);
ground and sub-surface temperatures;
surface visibility;
convective inhibition;
convective available potential energy (CAPE);
lifting condensation level (LCL);
Total Totals index;
apparent temperature; and
K-index Current and past input criteria may include:
satellite-derived temperatures; and
Doppler radar information such as dBZ level, tornado vortex signature, mesocyclone identifier, probability of severe hail, probability of hail, maximum predicted size of hail, vertically integrated liquid, maximum dBZ level height, storm top, and cell movement velocity (i.e., direction and speed).

In process step 112, a forecast of the risk of a severe weather is computed based on the model inputs shown above (among others) and calculated in process steps 108 and 110. One of ordinary skill in the art will appreciate that there are a number of acceptable and commonly used models, algorithms and processes for determining short-term, medium-term, and long-term severe weather risks at specific geographical locations. Any one or a combination of those processes could be used.

The key to process step 112 is the granularity of the spatial, temporal, and severity of the risk forecast. With regard to spatial granularity, the severe weather risk forecast is computed uniquely for the geographical location selected by the user/third party in process step 104 rather than for the larger geographical areas typically covered by NWS watches and warnings (i.e., generally county-wide areas). That is not to say that the severity of risk for a larger area surrounding the location of interest is not calculated and conveyed along with the severity level for the location of interest. For example, if a map is used to communicate degrees of risk of severe weather for a particular location, it might also convey the degrees of risk for adjacent geographic locations as well. Adjacent areas with the same degrees of risk could be combined to show that the risk levels cover a larger area.

With regard to temporal granularity, the severe weather risk forecast is computed for a time period interval as short as one minute and as long as, for example, 3 hours, and over a longer total time period in contrast to NWS watches and warnings. Shorter time period intervals and total forecast time periods are also contemplated, including minute-by-minute forecasts and seasonal forecasts.

With regard to the severity of the severe weather threat, the severe weather risk forecast is computed for a particular location, not just for the type of threat. Thus, for example, severe winds associated with a hurricane that is designated category 5 on the Saffir-Simpson scale may more appropriately be classified by some other scale or scale value for a unique geographical location not located in the forecasted centerline path of the hurricane.

In process step 114, an appropriate scale for conveying to the user the requested forecast of risk of severe weather is selected. The appropriate scale may be obvious. For example, if the only severe weather threat forecasted for the specific location by the severe weather risk forecasting module 106 is a tornado, then a five-point scale may be selected because most people are familiar with the Fujita Tornado Scale. However, if the forecast of risk of severe weather is a combination of two or more types of severe weather types, such as extreme high temperatures, severe winds, and reduced visibility, the appropriate scale to use may not be as obvious. In that case, a different scale may be appropriate other than a five-point scale.

Moreover, the appropriate scale to be used could be determined based on the requesting device. For example, a simple three-point color grid scale (i.e., green, yellow, and red) may be used if the requesting device is a mobile phone. A more complex scale may be used if the requesting device is a desktop computer. The type of scale selected may also depend on the format of the severe weather risk report being delivered or provided to the user. A simpler report may be better suited to a mobile phone display than the more complex report. The user may also select a scale to be used based on personal preferences. Forecast meteorologists can also utilize their professional expertise to select or suggest an appropriate scale. Additionally, the scale may account for non-weather phenomenological information. For example, a scale that combines a forecast of risk of severe weather, such as extreme high temperatures, with a pollution or air quality index, such as ozone levels (e.g., "good," "moderate," "unhealthy," etc.), may be appropriate and desired by a user suffering from an affliction, such as asthma.

Figure 2:
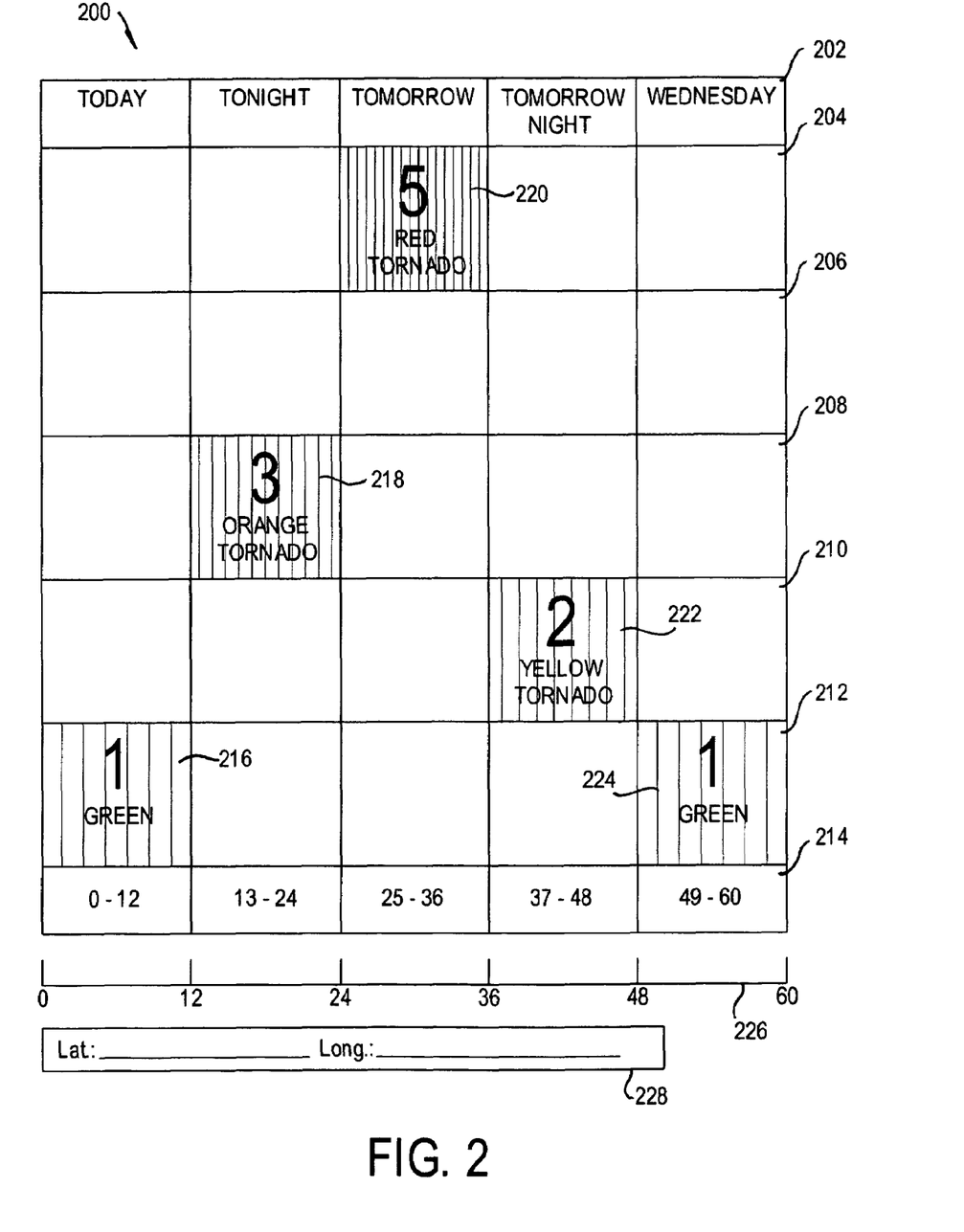
FIG. 2 is a schematic drawing of a sample report showing degrees of risk of severe weather according to a preferred embodiment of the invention.

In process step 116, for each time period interval T of the forecast time period, t, a forecasted risk of severe weather is assigned to an appropriate value according to the severe weather scale selected in process step 114. Thus, as shown in FIG. 2, the forecasted severe weather risk for the time period interval "Tomorrow" (or T=25–36 hours) is assigned a risk level of red (color), the word "red," the number "5," the word "Tornado," or some other indicia.

By way of example, a forecasted risk value or index may be computed as follows:

$$\text{Index} = (a_1 \times f_1) + (a_2 \times f_2) + \ldots + (a_n \times f_n)$$

or $$\text{Index} = [a_1 \times (f_1 + (a_2 \times f_2))] - \{[(a_3 \times f_3) + (a_4 \times f_4)] \times f_5\}$$

where: $a_n$ is a weighing constant and $f_n$ is a forecast model factor. Of course, the index may be computed in a number of different ways by adding, subtracting, multiplying the various constants and factors (or using some other mathematical operation such as linear or nonlinear regression techniques).

Consider the following example. Suppose a hurricane is pressing north from the Gulf of Mexico onto the panhandle of Florida. Forecast winds at the intersection of Ft. Pickens Rd. and Via Deluna Rd. on Santa Rosa Island (a barrier island) are expected to be 105 miles per hour (mph) (1-minute average peaks, which corresponds to category 2 winds on the Saffir-Simpson hurricane scale) during the next three hour time period interval. That forecast is based on output from numerical models supplemented with real-time nearby airport wind speed observations data and adjusted by a skilled hurricane forecasting meteorologist. In addition, storm surge is expected to raise flood levels to +3 feet, which will cover the aforementioned intersection and most of Santa Rosa Island. The following index is calculated where $a_1$ is a weighing factor for wind speed (say 0.1); $f_1$ is a measure of wind speed (e.g., 105 mph); $a_2$ is a weighing factor for flooding (say 6); and $f_2$ is a measure of flood (e.g., 3 ft.):

$$\text{Index} = (a_1 \times f_1) + (a_2 \times f_2) = (0.1 \times 105) + (6 \times 3) = 28.5$$

That index value is then compared to a scale to come up with the degree of risk for the intersection on Santa Rose Island for the next three hours. For example, the index value of 28.5 may correspond to a level "red" (i.e., on a white, green, yellow, orange, and red scale), or it may correspond to the number 5 (i.e., on a scale of 0–5), or it may correspond to the descriptor "extreme" (i.e., on a "low," "moderate," "high," and "extreme" scale). Another forecast for the subsequent three hour period is then estimated and a new index is calculated. The next three hour period is then assessed, etc. The time periods calculated and communicated for the risk index do not have to be in three hour increments; they could be in any appropriate increments, as short as one minute or as long as an entire season.

In process step 118, a severe weather risk report is generated or provided to the user via a communications network (e.g., pulled by a client computer from a server via the Internet). A report such as that shown in FIGS. 2, 3, and 4 can be delivered or provided or otherwise made available in any suitable format, including, but not limited to, print, television, or the Internet. For example, the report could be a computer generated image displayable on a television image over a green screen background typically used by a broadcast meteorologist. The threat level can be based on likelihood, the type of risk, or both.

FIG. 2 shows a sample severe weather risk scale report 200 according to a preferred embodiment of the invention. As can be seen, the severe weather risk report 200 indicates the severity of risk for time periods of less than a day for the geographic location of interest. The degree or severity of risk is conveyed using both color (green, yellow, and red in the present example, although, as printed, the colors are represented by gray scales) and position along the vertical axis (from level 1 at the bottom to level 5 at the top). Of course, as described previously, such specifics are illustrative rather than limiting. Such a graphical indication allows the reader to grasp the necessary information quickly.

The top row 202 of the severe weather risk report 200 indicates the temporal aspect of the indicated severe weather threat. As shown in FIG. 2, the temporal aspect of the indicated severe weather threat is a segmented chronological scale covering a three day time period divided into five equivalent time period intervals.

The bottom row 214 of the severe weather risk report 200 indicates an alternative segmented chronological scale. The segmented chronological scale in row 214 covers a 60 hour time period divided into 12-hour time period intervals.

As an alternative to either or both of the rows 202 and 214, the timeline 226 could be used. The timeline 226 covers the same 60 hour time period divided into 12-hour time period intervals as shown in row 214.

The time period intervals shown in top row 202, bottom row 214, and timeline 226 do not have to be 12 hours long. They could be, for example, one minute in duration.

Row 204 indicates the highest severity of risk, in this case corresponding to level 5. In the example severe weather risk report 200 shown in FIG. 2, a severe weather risk indicia 220 corresponding to risk level 5 is shown in the middle column.

Row 206 indicates the next lower severity of risk, in this case corresponding to level 4.

Row 208 indicates the next lower severity of risk, in this case corresponding to level 3. In the example severe weather risk report 200 shown in FIG. 2, a severe weather risk indicia 218 corresponding to risk level 3 is shown in the second column from the left.

Next, row 210 indicates the next lower severity of risk, in this case corresponding to level 2. In the example severe weather risk report 200 shown in FIG. 2, a severe weather risk indicia 222 corresponding to risk level 2 is shown in the second column from the right.

Next, row 212 indicates the next lower severity of risk, in this case corresponding to level 1. In the example severe weather risk report 200 shown in FIG. 2, a severe weather risk indicia 216 and a severe weather risk indicia 224 corresponding to risk level 1 are shown in the first and fifth columns of the grid.

The severity level shown for each particular time period interval is the highest severity level calculated for the time period interval.

As shown in FIG. 2, the indicia 216, 218, 220, 222, and 224 may be in the form of a color filled block (e.g., red for level 5, orange for level 3, yellow for level 2, and green for level 1). It may also or alternatively be in the form of text inside the filled color in the box (e.g., the word "red" for a red box, "orange" for an orange box, etc.). It may also or alternatively be in the form of a numerical value (e.g., "5" for level 5, "4" for level 4, etc.). It may also or alternatively be in the form of a specific weather type descriptor inside the box (e.g., the words "tornado," "hail," etc.). It may also or alternatively be a picture or other type of graphic in the box (e.g., a picture of a tornado) (not shown). Any type of indicia that clearly and quickly conveys the degree and temporal aspect of the forecast of risk of severe weather is contemplated as part of the invention.

FIG. 2 also shows a location indicator 228 associated with the severe weather risk report 200. The location indicator 228 provides information about the geographical location that corresponds to the risk of severe weather information contained in the FIG. 2. In FIG. 2, the location indicator 228 includes latitude and longitude information, preferably provided by the client computer or entered by the user. Other geographic location information may be used instead of, or in addition to, the latitude/longitude information. In fact, any reference coordinate system could be used as a basis for determining the specific geographic location information (e.g., Universal Transverse Mercator, Military Grid Reference System, World Geographic Reference System, etc.).

Figure 3:
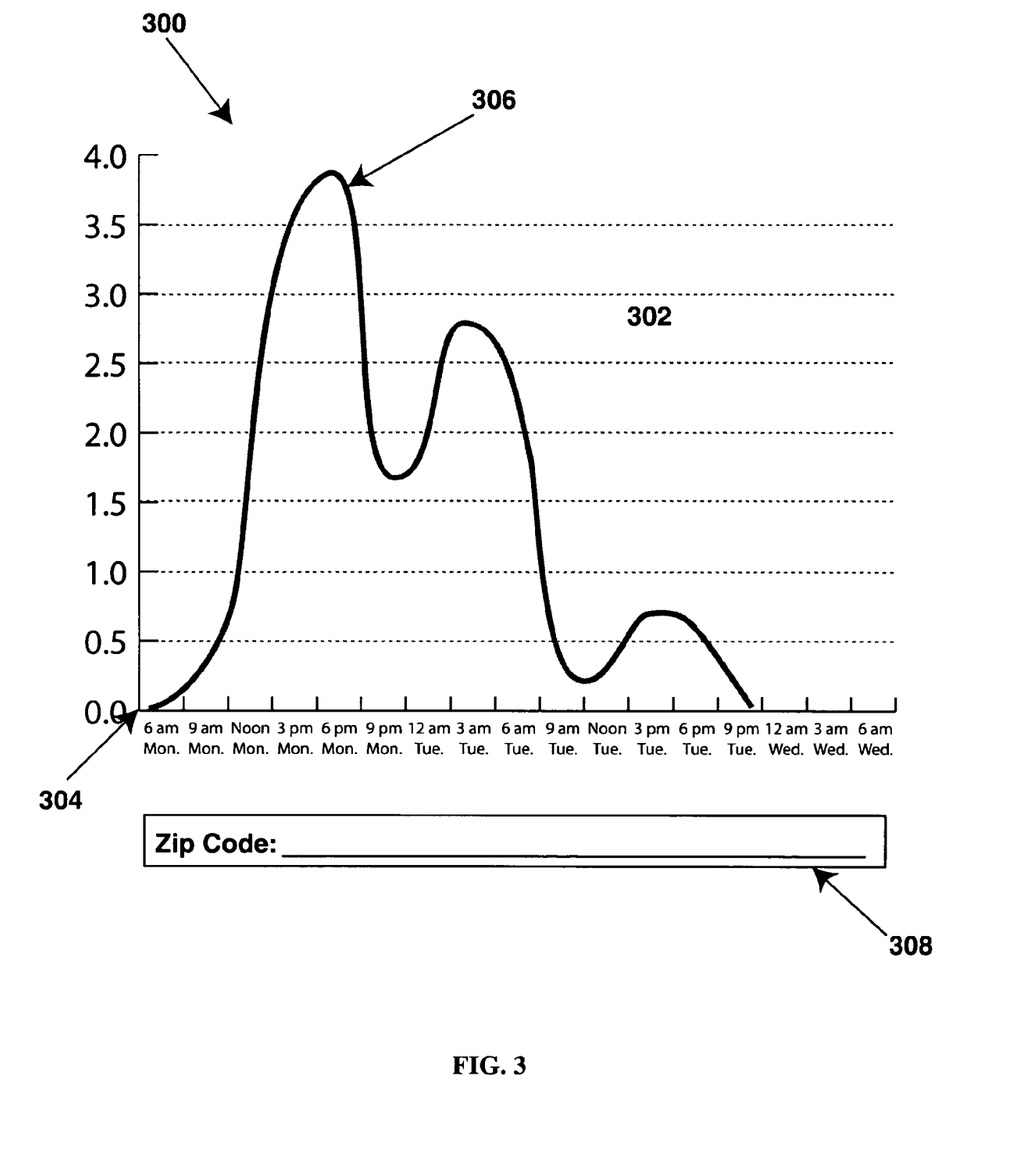
FIG. 3 is a schematic drawing of another sample report showing degrees of risk of severe weather according to a preferred embodiment of the invention.

Turning now to FIG. 3, shown therein is a schematic drawing of another sample severe weather risk report 300 according to the preferred embodiment of the invention. In FIG. 3, the severe weather risk report 300 is a time series plot 302 of severe weather risk information plotted relative to an x-y scale 304. The x-axis time series shown, in this case, covers a 72-hour time period, with the level of risk shown for every minute, presented on a timeline graph. The y-axis represents the scale of degrees of risk or risk levels (here, levels 0–4).

FIG. 3 also shows a location indicator 308 associated with the severe weather risk report 300. The location indicator 308 provides information about the geographical location that corresponds to the severe weather risk information contained in the FIG. 3. In FIG. 3, the location indicator 308 contains zip code location information, but other geographic information representing the geographic location of interest could be used.

Other embodiments of the severe weather risk reports are contemplated as part of the present invention. They include color maps with superimposed risk scales (i.e., contoured risk levels using colors like in FIG. 2). Thus, for example, a map may be a geographical zone defined by a zipcode or even a region of the United States, such as the southeastern states, and have a contoured shape superimposed over the zone that is shaded red to indicate a level 5 risk, or the highest severe weather risk within the portion of the zone covered by the contour. An orange contour outside of and surrounding the red contour may be included to indicate a level 4 severe weather risk area, etc.

Figure 4:
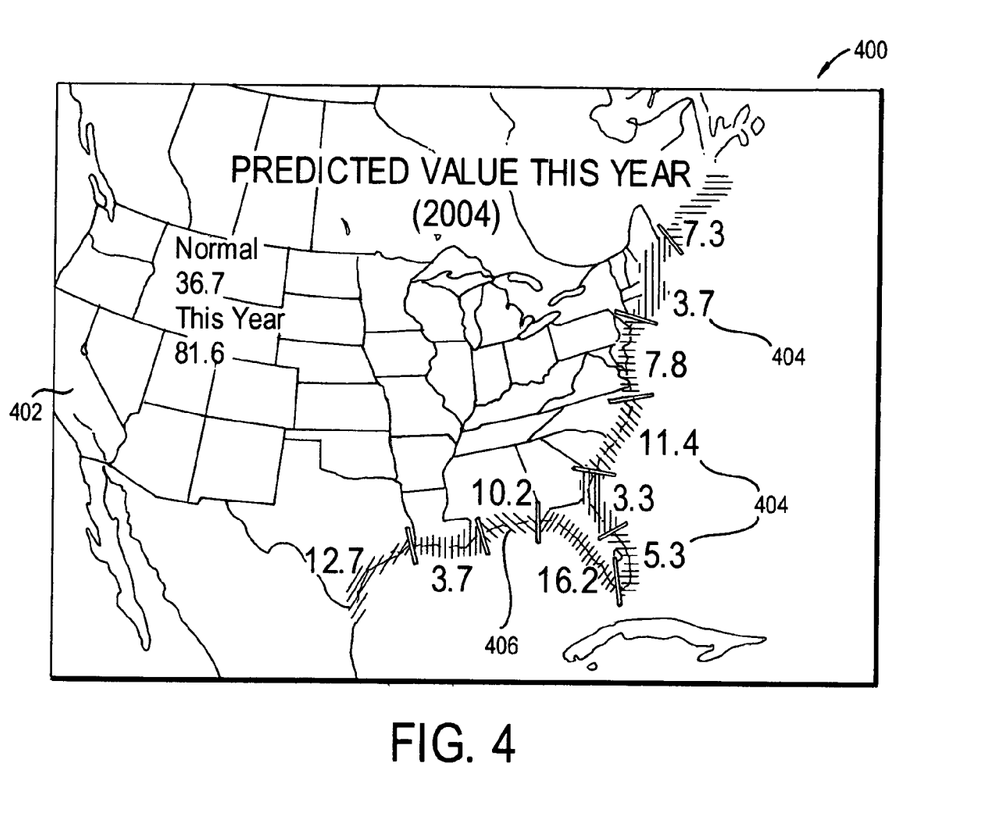
FIG. 4 is a map overlay drawing of another sample report showing degrees of risk of severe weather according to a preferred embodiment of the invention.

Turning now to FIG. 4, shown therein is a sample severe weather risk report 400 in the form of a map overlay. In the report 400, a partial map 402 of North America is shown with a scale 404 indicating degrees of risk of hurricanes forecast to impact individual geographic regions along the southeastern and eastern coast of the United States during the 2004 hurricane season. Thus, for example, if a person requested a report for Santa Rosa Island, Fla., outside Pensacola, a report might be generated showing that location with a risk level of 10.2 indicated on map (shown by reference number 406 on the map) for the forecast period covering the entire season. The portion of the coast corresponding to Santa Rosa Island is colored red (or some other color), or have other indicia in addition to the number "10.2" to further clarify or express the degree of risk.

Moreover, to further indicate the severity level of the forecasted risk at Santa Rosa Island, it might be useful to show comparative risk levels for adjacent geographic locations. Thus, individual risk levels for nearby locations are grouped together to simplify the display of information. In the case of FIG. 4, the coastline is divided into approximately even length increments to display different risk levels. Thus, while the forecasting method is focused on specific geographic location information provided by the user or third party, the severe weather risk reports may include additional geographic locations to better convey the risk information in context.

Although this invention has been described in connection with specific embodiments, objects and purposes for the invention, it will be appreciated by one of skill in the art that various modifications of the invention, other than those discussed above, may be resorted to without departing from the nature and scope of the invention, and numerical values described above are illustrative rather than limiting.

We claim:

1. A computer implemented method for conveying a risk and degree of severe weather at a location, the method comprising:
    (a) receiving over a communications network location information from a requestor indicating the requestor's present location at a present time;
    (b) converting the location information into geographic coordinates;
    (c) identifying present and historical natural phenomenological data associated with an area around the location;
    (d) calculating natural phenomenological information associated with the area around the location;
    (e) forecasting a risk of severe weather associated with the location for a specific time period that includes at least the present time;
    (f) calculating a degree of severity level of the risk of severe weather for the location;
    (g) generating a report containing the risk forecast and the calculated severity level for the coordinates; and
    (h) communicating the report to the requestor via the communications network or a second communications network.

2. The method of claim 1, wherein the step of communicating the report to the requestor is accomplished by providing the report in an electronic file downloadable to a client computer at the requestor's location.

3. The method of claim 2, wherein the client computer is a mobile phone.

4. The method of claim 2, wherein the step of communicating the report to the requestor is accomplished by delivering the report to a client computer at the requestor's location.

5. The method of claim 4, wherein the client computer is a mobile phone.

6. The method of claim 1, further comprising the steps of:
    (h) selecting a scale having a plurality of levels of severity;
    (i) converting the forecast risk of severe weather and the degree of severity into an index value for the time period; and
    (j) assigning the index value to one of the plurality of levels of severity.

7. The method of claim 1, wherein the severity level is indicated graphically.

8. The method of claim 7, wherein the severity level is indicated using indicia.

9. The method of claim 8, wherein the severity level is also indicated by position on an axis.

10. The method of claim 7, wherein the severity level is also indicated by position on an axis.

11. The method of claim 1, wherein the severity level is indicated numerically.

12. A method for conveying a risk and degree of severe weather at a location, the method comprising:
    (a) receiving over a communications network geographic location information for a location of interest at a present time;
    (b) identifying present and historical weather data associated with an area around the location of interest;
    (c) calculating weather data associated with the area around the location of interest;
    (d) forecasting a risk of severe weather associated with the location for a specific time period that includes at least the present time;
    (e) calculating a degree of severity level of the risk of severe weather for the location of interest;
    (f) generating a report containing the risk forecast and the calculated severity level for the geographic location; and
    (g) communicating the report via the communications network or a second communications network.

13. The method according to claim 12, further comprising the step of converting the geographic location information into a position relative to an x-y coordinate system.

14. The method of claim 12, wherein the step of communicating the report is accomplished by storing the report in an electronic file on a server connected to the communications network, such that the electronic file is adapted to being downloaded to a client computer connected to the communications network.

15. The method of claim 14, wherein the client computer is a mobile phone.

16. The method of claim 12, wherein the step of communicating the report to the requestor comprises the steps of:
    (a) storing the report in an electronic file on a server;
    (b) establishing a link from a server to a client computer via the communications network; and
    (c) delivering the report to the client computer.

17. The method of claim 16 wherein the client computer is a mobile phone.

18. The method of claim 12, wherein the severity level is indicated graphically.

19. The method of claim 18, wherein the severity level is indicated using indicia.

20. The method of claim 19, wherein the severity level is also indicated by position on an axis.

21. The method of claim 18, wherein the severity level is also indicated by position on an axis.

22. The method of claim 12, wherein the severity level is indicated numerically.

23. The method of claim 22, wherein the severity level is also indicated graphically.

24. A computer implemented method of conveying a risk and degree of severe weather at a location, the computer implemented method comprising:
    (a) providing at least one server comprising computer readable data storage medium having program code recorded thereon, the server connected to a communications network;
    (b) receiving via the communications network a signal representing geographic location information for a location of interest at a present time;
    (c) identifying present and historical weather data associated with an area around the location of interest; and
    (d) executing the program code to compute weather data, a risk of severe weather for a specific time period that includes at least the present time, and a degree of severity level for the risk of severe weather, corresponding to the location of interest;
    (e) outputting a report containing the risk forecast and the computed severity level; and
    (f) communicating the report via the communications network.

25. The computer implemented method of claim 24, wherein the communications network is the Internet.

26. The computer implemented method of claim 24, wherein the severity level is indicated graphically.

27. The computer implemented method of claim 26, wherein the severity level is indicated numerically.

28. The computer implemented method of claim 24, wherein the severity level is indicated with color.

29. The computer implemented method of claim 24, wherein the step of communicating the report via the communications network is accomplished verbally in a broadcast network.

30. The computer method of claim 24, further comprising the step of:
 (g) receiving the report on a mobile phone via the communications network.

* * * * *